July 21, 1931. L. DE FLOREZ 1,815,870
REGULATING SYSTEM FOR FLUID SUPPLIES
Original Filed Jan. 21, 1926 4 Sheets-Sheet 4

Fig. 5.

Inventor
Luis de Florez.
By his Attorney
R. J. Dearborn.

Patented July 21, 1931

1,815,870

UNITED STATES PATENT OFFICE

LUIS DE FLOREZ, OF POMFRET, CONNECTICUT, ASSIGNOR, BY MESNE ASSIGNMENTS, TO THE TEXAS COMPANY, OF NEW YORK, N. Y., A CORPORATION OF DELAWARE

REGULATING SYSTEM FOR FLUID SUPPLIES

Continuation of application Serial No. 82,865, filed January 21, 1926. This application filed June 12, 1930. Serial No. 460,621.

My invention relates to a method and means for controlling a fluid in response to variations in the value of a condition and in one of its aspects may be regarded as the control of the flow of a fluid by effecting the control of the head of the controlled fluid in response to variations in the value of the condition. Such control may be used to maintain the flow of the controlled fluid at a substantially uniform rate or it may be used to cause variations thereof which are functions of the variations in the value of the condition.

The condition, the values of which are effective to supervise or determine the control of the fluid flow in the fluid supply system, may be the condition of pressure, or of temperature, or of any other suitable factor. The variations in the value of this condition may be dependent upon the variations of the flow of the controlled fluid, as for instance, in the case of a pyrometer affected indirectly by variations in the flow of a controlled fuel, or the variations in the value of the condition may be wholly independent of any reaction caused by the fluid flow. As an example of the latter, the control of the fluid flow in the supply system may be in response to variations in the temperature, or pressure, or other condition, of a parallel flowing fluid which is entirely independent of the fluid system under control so that the flow of fluid under control shall be proportionate to the change of condition in the parallel flowing fluid; likewise, changes in a condition independent of the controlled fluid flow may be set up by an operator or mechanism at some remote point, such as a central station, in response to which condition changes, the flow of fluid is controlled. In the case of these and other examples which might be set forth of the control of the fluid flow in response to changes in the value of a condition which is independent of the fluid flow, the term "arbitrarily" has been employed in some of the claims to include this type of control as well as where the condition is dependent upon the flow. The control effected may be arbitrary with reference to any effect produced by the resultant flow of fluid.

In the preferred embodiment of my invention the control of the flow of the controlled fluid may be effected by operating upon the head of the controlled fluid in response to variations of an intermediate controlling mechanism. This intermediate controlling mechanism is actuated by a mechanism which may be termed the supervisory control and which in turn responds to changes in the value of the condition. In other words, the intermediate controlling mechanism is actuated responsively to the changes in the value of the condition through means of the supervisory control. Such intermediate controlling mechanism may be a current responsive device, such, for instance, as an electric or fluid motor controlled by variations of the supervisory control, which may comprise, for instance, a pyrometer or other heat-responsive device, and the control effected by the supervisory control of the intermediate control may be the control of the flow of current (fluid or electric) to the intermediate controlling device.

It has heretofore been common in the prior art to control the amount of fluid, as for instance, fuel passing to a furnace, or other apparatus to be heated, by merely varying the port opening of a valve in the fuel delivery line in proportion to the desires change in the amount of fuel. By varying the port opening of the customary uniformly opening valve, however, a proportional variation in the amount of fluid passing past the valve is not necessarily realized, owing to the well known property of fluids to pass through the constricted opening which may thus be formed, at a greater rate than when the opening is larger, and for this reason a strictly proportional variation in the amount of the fuel delivered is not obtained. Thus, for example, if the fully open valve be closed to a point to give one-half the port opening it had when fully open, the amount of fluid which will pass through the valve will be greater than one-half the amount delivered by the valve in the full open position, assuming a substantially constant pressure of the fluid supply source. This phenomenon is particularly detrimental when it is desired to accurately control the amount of fluid delivered past the valve or, in other words, to control the flow of the fluid on the delivery side of the valve.

In accordance with my invention, I can control the fluid flow independently of any particular setting of the valve between the source of fluid supply and the controlled supply line, since I operate directly to control the pressure head on the delivery side of the valve and consequently to control the primary factor which determines the rate of fluid flow. In other words, I do not attempt to vary specifically the port opening of the valve but the desired result is accomplished by making the valve responsive to the pressure head on the delivery side of the valve in such a manner that with a given setting of the control mechanism it tends to maintain a constant delivery pressure, the valve port opening automatically adjusting itself to whatever position may be required for the purpose. To definitely change the pressure head, and consequently the flow, as may be called for by the supervisory control, the relationship of the control mechanism setting to the pressure head is changed. It will thus be seen that my invention also provides for automatically compensating for variations in the supply source pressure by varying the port opening of the valve between the source of supply and the supply line.

Thus in accordance with my invention I accomplish the control of flow by controlling the mean pressure on the delivery side of the valve in response to changes of the supervisory control and I also independently vary the port opening to compensate for any changes which may take place in the fluid pressure of the supply source. By the application of my invention I am enabled to obtain an accurate control of the fluid flow and it will be observed that my invention, therefore, permits the regulation of the fluid flow by effecting a regulation of the mean delivery pressure without regard necessarily to the area of the valve port opening.

The type of supervisory control, which may be applied in the preferred embodiment of my invention to the regulation of the current (fluid or electric) actuating the intermediate control, may vary widely, according to the conditions under which the apparatus is designed to operate. I may, for instance, use a switch or valve actuated by the supervisory control and remaining in operative condition until disabled by a predetermined reading or change of condition of the supervisory control; I may use a type of control in which current is delivered in one direction or the other, such control being continuously operative and the direction of its correction being determined by the supervisory control; I may use a control similar to the foregoing but having periods of inactivity by reason of a neutral position, the periods of inactivity and the direction of correction being determined by the supervisory control; or I may use a device in which the current to the intermediate controlling mechanism is incrementally applied in one or both directions, such increments varying in the strength of the corrective impulse applied, or in the direction in which they are applied, or in the duration of their application, or if desired two or more of such factors of regulation may be combined.

One type of system which I may employ to accomplish supervisory control responsive to changes in the value of the condition is particularly well suited to its purpose and provides periodical impulses which bear a definite relationship to the departure of the value of the condition from the predetermined or selected value. The intermediate control which cooperates with the supervisory control may comprise a major control and a minor control which cooperate to produce the desired result. The minor control makes corrections preferably periodically from a base previously established by the major control, but when these corrections add in one direction to a predetermined sum, the major control becomes operative to change the base. From this new base the minor control thereafter operates until the minor corrections again amount to the predetermined sum. The major and minor controls are operated preferably by electrical energy supplied responsively to the supervisory control and an additional important feature of the supervisory control system, therefore, comprises means which are adapted to make periodical contact for periods of time, each of which are preferably proportional to the departure of the value of the condition from the predetermined value. Thus, for example, in the control of temperature, if the temperature is close to the predetermined or desired temperature, only a short period of contact will result and a correspondingly small correction will be made in the supply line pressure head; on the other hand, if the departure of temperature from that desired has been great, a longer period of contact will result and a large correction will be made.

Further advantages of my invention will become apparent to those skilled in the art upon the examination of the following specification and drawings.

In the drawings

In the various figures of the drawings the same numerals indicate like parts of the apparatus.

Figure 1:
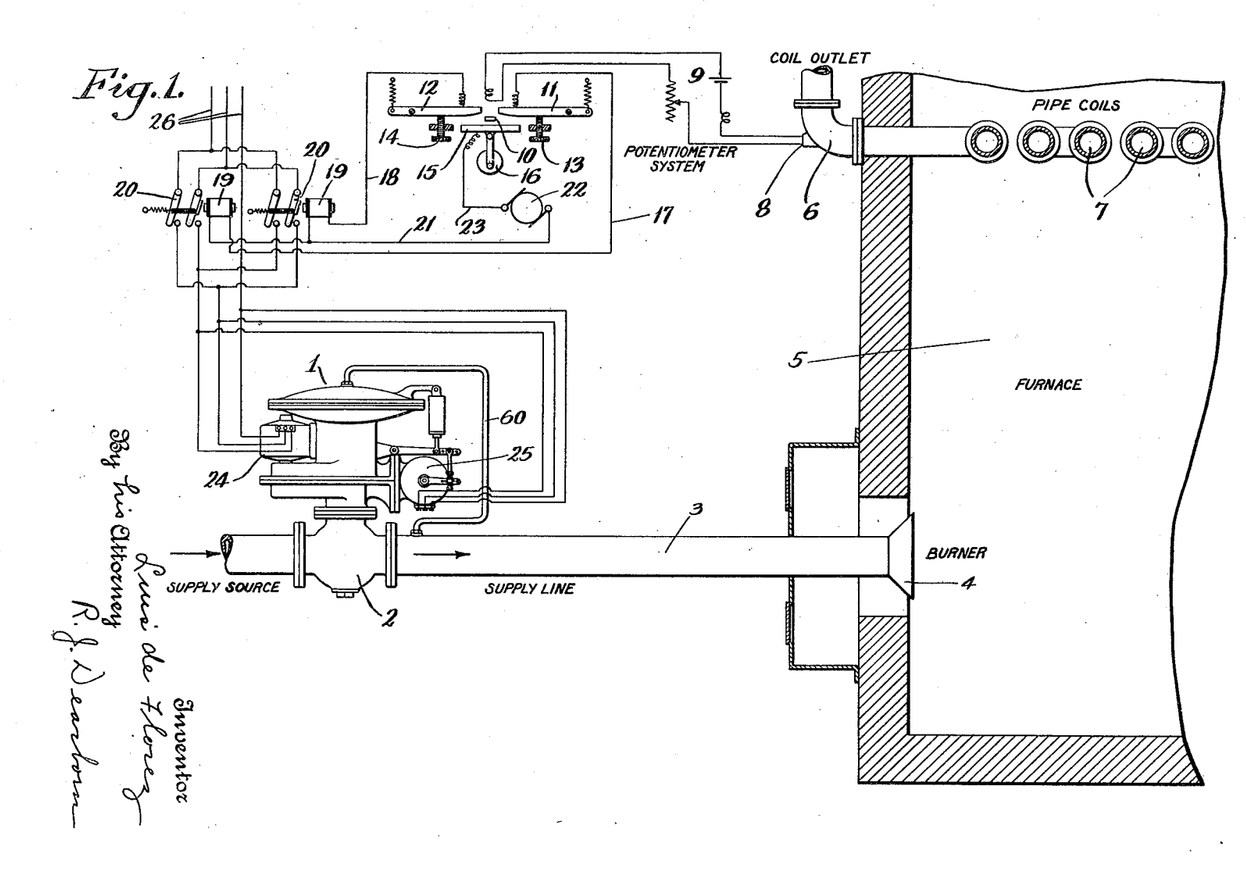
Figure 1 is a diagrammatic illustration partially in section of my control system applied to the regulation of the temperature of coils in a furnace.

In Figure 1, 1 indicates the valve control mechanism for affecting the position of the valve in the valve casing 2. This valve controls the flow of fluid fuel from the supply source, which may be from a gas main or an oil tank or any other suitable source. Supply line 3 leads the fuel to the burner shown diagrammatically at 4, situated in an opening in the wall of the furnace 5. The control system is illustrated in Figure 1 as controlling the temperature at the outlet 6 of the pipe coils 7 through which oil may be passing to be heated by the furnace 5 to a cracking temperature. A thermo-couple 8, or other suitable temperature reflecting device, is situated at the point whose temperature is to be controlled. The leads from this thermo-couple are connected to a galvanometer or potentiometer system shown diagrammatically at 9 in the manner well known in the art. The galvanometer needle is indicated at 10 and is positioned so as to move in a horizontal plane. Switch members 11 and 12 are pivotally mounted within the range of movement of the galvanometer needle 10 but in a plane slightly above the plane in which the needle normally moves. The switch members are provided with adjustable stops 13 and 14 against which they are normally held by springs or other resilient means. Below the galvanometer needle 10 there is provided a chopper 15 operated continuously by any suitable mechanism illustrated diagrammatically at 16, periodically causing the chopper to be brought into contact with the needle 10 which in turn may strike one of the members 11 or 12 and deflect the same. This, of course, does not occur if the needle 10 is in a central position between the members 11 and 12 corresponding to the predetermined or selected temperature. The members 11 and 12 are connected respectively to conductors 17 and 18, which in turn are connected to solenoids 19, adapted to close the switches 20. These switches are normally retained in open position by springs. The solenoids 19 have a common terminal which is connected by conductor 21 to one of the terminals of a source of electrical energy illustrated diagrammatically by the generator 22. The other terminal of the generator 22 is connected by conductor 23 to chopper 15. The switches 20 control the energization of the motors 24 and 25 which are connected in parallel and which receive power through the conductors 26 from any suitable source (not shown).

By the periodical upward movement of the chopper 15 the galvanometer needle 10 may be brought into contact with one of the members 11 or 12 depending upon the direction in which it has been deflected by a change in temperature responsive to the thermo-couple 8. The contacting of chopper 15, galvanometer needle 10 and one of the members 11 or 12, closes one of the circuits through conductors 17 or 18 to energize one of the solenoids 19, which will in turn close the switch controlled by it. It will be observed that the inner ends of members 11 and 12 are curved upwardly and they thus give a period of contact which varies with the extent of the deflection of the galvanometer needle from its normal position representing the normal temperature. Consequently the periods of time for which the motors 24 and 25 are energized will be dependent upon the extent of the departure of the temperature in the outlet 6 from the desired temperature. I may use other apparatus to obtain periods of contact proportional to the variation of the value of a condition from normal, such as the devices described in my copending application Serial No. 579,603, filed August 4, 1922, and in my Patent No. 1,650,889 granted November 29, 1927, on application Serial No. 69,373, filed November 16, 1925.

Figures 2, 3:
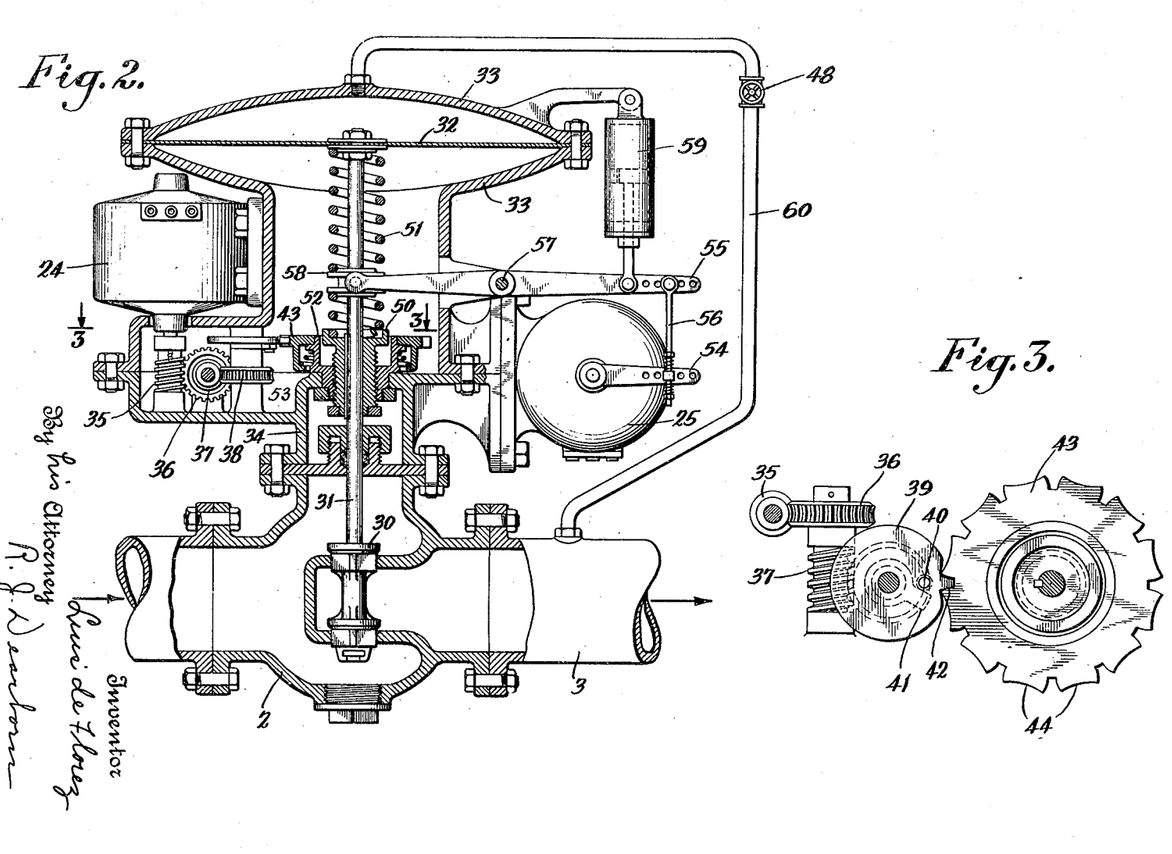
Figure 2 is a partially sectional elevation of the valve control mechanism.
Figure 3 is a plan view of a part of the valve control mechanism.

In Figure 2 a detailed illustration of the valve control mechanism is shown. Within the valve casing 2 the balanced valve 30 is shown in a partially open position. The valve 30 is suspended on the valve stem 31, which is attached to and supported by the diaphragm 32 in the diaphragm casing 33. The diaphragm casing 33 is mounted on the casing 34, which in turn is rigidly supported by the valve casing 2. The motors 24 and 25 also are rigidly supported by the casings 33 and 34.

The shaft of the motor 24 is connected to a worm 35 and by the rotation of the motor 24 corresponding motion is transmitted through the worm and gear train consisting of worms 35 and 37 and gears 36 and 38. Upon the shaft of the gear 38 is loosely mounted a Geneva stop pinion 39 having a pin 40 adapted to cooperate with the finger 41 which is keyed to the shaft of the gear 38, to turn the Geneva stop pinion 39 if and when the finger 41 is rotated the proper distance by operation of the motor 24 through the worms and gears 35, 37, 36 and 38. The Geneva stop pinion 39 has a single tooth 42 which cooperates with the Geneva stop wheel 43 to move the same a fraction of a turn and it will be observed that a further movement of the wheel 43 will only take place after a complete revolution of the finger 41. The teeth 44 of the Geneva stop wheel 43 are formed with concave surfaces which cooperate with the circular edge of the Geneva stop pinion 39 to prevent any movement of the Geneva stop wheel 43 except by cooperation of the tooth 42. On the valve stem 31 is slidably keyed a sleeve 50, the top of which is adapted to serve as a seat for one end of a compression spring 51. The other end of the spring 51 presses against the lower side of the diaphragm 32 while the coils of the spring encircle the valve stem 31. A member 52 is rotatably mounted on a portion of the casing 34 which serves as a bearing therefor. The member 52 is internally threaded to cooperate with the sleeve 50 which is externally threaded so that the member 52 may freely rotate to raise or lower the position of the sleeve 50. The wheel 43 rests on the upper side of a flange on the member 52, while the wheel 43 and member 52 are firmly but yieldingly held against each other by a stiff spring 53 compressed between the lower side of the flange and an extension of the wheel 43. This compels transmission of any movements of the wheel 43 into corresponding movements of the member 52.

An arm 54 is mounted on the shaft of the motor 25 yieldingly connected to one end of the lever 55 by a link and springs 56. Lever 55 is pivoted at 57 and the other end of the lever cooperates with the slidable collar 58 on the valve stem 31. The collar 58 is so secured to the spring 51 that any movements of the lever 55 serve to increase or decrease the pressure of the spring 51 against the diaphragm 32. The dash pot 59, suspended from the diaphragm casing 33 is also connected to lever 55 and prevents too sudden a movement of this member. An additional important function of the dash pot 59 is to prevent a sudden reaction upon the diaphragm 32 through the pipe 60 because of any temporary puffs of pressure which may, by design, be created by the application of the corrections effected by the motor 25. Thus when a momentary correction is made to increase the port opening of the valve 30 the spring 51 is pressed upwardly by the lever 55. This increased pressure of the spring 51 raises the diaphragm 32 and causes the valve 30 to open further. This movement of the valve will cause a momentary increase in the pressure in the supply line 3 which would immediately be reflected through the pipe 60 to the upper diaphragm chamber and would tend to close the valve 30 by depressing the diaphragm 32 and pressing downwardly on the lever 55 through spring 51. The dash pot 59, however, will tend to prevent this action by allowing the lever 55 to return only slowly to its normal position.

A pipe 60 forms a connection between the supply line 3 and the upper chamber of the diaphragm so as to change the position of the valve 30 if any unusual fluctuation in the supply line pressure occurs. Pipe 60 may be provided with a valve 48 to control the passage of fluid therethrough.

The operation of the valve control mechanism shown in Figure 2 is as follows: As previously described the motors 24 and 25 are in parallel and periodically receive impulses in one direction or the other by the closing of one or the other of the switches 20 in response to the periodical contacting mechanism shown in Figure 1. In the preferred embodiment of my invention the contacting mechanism makes contacts which are proportional to the departure of the temperature from the predetermined temperature, but this relationship may bear any other fixed relationship to the changes in the value of the condition. When the motor 24 is thus energized it is only for a short period of time and through the worm and gear train will move the finger 41 a short distance. No movement of the Geneva stop pinion 49 will take place, however, unless the finger 41 happens to be near the pin 40. The next impulse of the motor 24 will move the finger 41 a further short distance so that it will require a considerable number of the periodical impulses reflected from the contacting mechanism to rotate the finger 41 a complete revolution. Assuming that the finger 41 has cooperated with the pin 40 of the Geneva stop pinion 49 to move the Geneva stop wheel 43 a fraction of a turn represented by the width of one of the teeth 44, it will be observed from the foregoing description that a complete revolution in either direction of the finger 41 will be required to cause a further movement of the wheel 43. As previously pointed out both positive and negative corrections are made, depending upon the direction in which the galvanometer needle moves from the central point in response to changes in the temperature. Consequently the finger 41 may be moved in either a clockwise or counter-clockwise direction without completing a revolution and therefore without causing a movement of the wheel 43. In fact when the regulation of the system has become more or less stabilized the number of major corrections will become quite infrequent and the finger 41 will move back and forth without effecting a movement of the wheel 43. When the Geneva stop wheel 43 is moved a fraction of a turn this movement is transmitted through the spring 53 to the member 52 which screws the sleeve 50 up or down, depending upon the direction of the correction to be applied. This change in the position of the sleeve 50 changes the compression on the spring 51 and consequently on the diaphragm 32 and causes an opening or closing, as the case may be, of the valve 30. The changes which may thus be made in the setting of the valve 30 by movements of the motor 24 constitute the major corrections in the valve setting.

When the motor 25 is energized its movement is transmitted into a corresponding movement of the lever 55 which momentarily increases or decreases the compression of the spring 51 through the collar 58. This movement, however, is only temporary inasmuch as the base from which these corrections are made is controlled by means of the motor 24 and its related mechanism. The dash pot 59 serves to slow up the return movement of the lever 55 after the motor 25 has become deenergized and prevents too sudden movements of the valve setting mechanism, as heretofore pointed out.

The corrections in the valve setting which may be induced by movements of the motor 25 constitute the minor corrections which are effective to change the flow of fluid with each periodical contact of the contacting mechanism. It is to be understood that these corrections follow each other at frequent intervals but it will be observed that after each of the corrections, thus applied, the pressure head returns to the value determined by the rotation of the motor 24 acting through the spring 51 and diaphragm 32. If, during the operation of the above described supervisory control and intermediate control mechanisms, a change should occur in the pressure of the fluid supply source a similar change would take place in the rate of flow in the supply line. To compensate for such changes the pipe 60 immediately reflects any changes in pressure to the upper chamber of the diaphragm, causing a corresponding change in the position of the diaphragm 32 and through the valve stem 31 in the position of the valve 30. Thus, for example, if the pressure of the fluid supply source increases the diaphragm 32 will be depressed and the valve 30 will consequently be partially closed to offset or compensate for this increase in fluid supply pressure. The opposite effect is produced if the supply pressure decreases.

It becomes obvious from the foregoing description that the diaphragm 32 serves as a means for balancing opposing forces and of establishing the desired pressure head in the supply line. One of these forces consists in the pressure applied to the upper side of the diaphragm 32 (in Figure 2) by the fluid through the pipe 60 which connects with the supply line 3. The second force which serves to balance the first force, when the diaphragm 32 is in a state of equilibrium, is furnished by the spring 51 pressing upwardly against the diaphragm 32. Either of these two forces may change and, unless the change be equal and simultaneous, the position of the diaphragm 32 will be changed and, since the valve 30 is directly connected by the valve stem 31 to the diaphragm 32, the position of the valve will be altered. Thus if any fluctuation occurs in the pressure of the supply source this will immediately be reflected through the pipe 60 to the upper diaphragm chamber and the port opening of the valve 30 will be changed to compensate for this change in pressure, again restoring the pressure in the supply line 3 to that desired. On the other hand, the second force may be changed as called for by the supervisory control and, to restore the balance between the two opposing forces, a greater or lesser pressure will be required in the upper diaphragm chamber. Assuming a constant pressure of the supply source, this change of course will be brought about by a change in the valve port opening. It is conceivable, however, that if an increase in the rate of flow and consequently in the pressure head of the supply line 3 should be called for by the supervisory control and an increase of the desired amount should occur simultaneously in the pressure of the supply source, obviously no movement of the valve 30 would occur to supply the desired increase in the flow. It is apparent, therefore, that I am enabled by my invention, as previously pointed out, to control the flow in the supply line without regard necessarily to a specific valve port opening.

Figure 4:
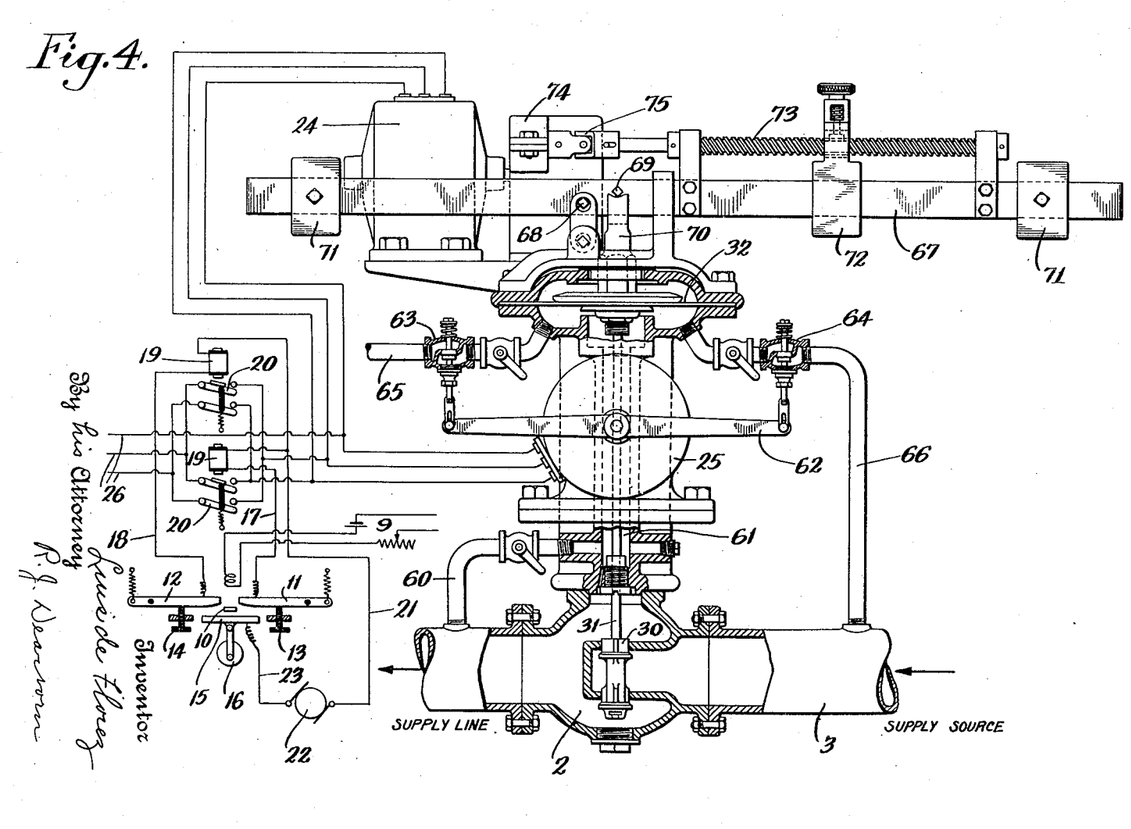
Figure 4 is a partially sectional elevation of a modified form of the valve control mechanism.

In Figure 4 the supply line is connected by pipe 60 to a passage 61 which leads to the lower chamber of the diaphragm 32. This allows fluctuations in the supply line pressure to vary the valve setting as in the apparatus shown in Figure 2. In the modification of Figure 4 the motor 25 is mounted centrally and has a lever 62 fixed to the motor shaft for operating by movement of the motor and lever and poppet valves 63 and 64 in the pipes 65 and 66. Pipe 66 is connected to the fluid supply source and leads to the lower chamber of the diaphragm 32. Pipe 65 leads from this chamber and since it is an exhaust pipe it may lead to a separate burner in the furnace, in the case where the fluid being regulated is a fuel, or in other cases to any suitable exhaust point. It will be observed that, by the opening of the valve 64, fluid under pressure will flow into the lower diaphragm chamber and tend to raise the diaphragm 32 and partially close the valve 30. This action of course occurs when the supply line pressure becomes too great. On the other hand, if the supply line pressure decreases below the desired point the motor 25 will open the valve 63 and permit the diaphragm to lower, opening the valve 30.

A beam 67 is pivotally supported at 68 on the diaphragm casing and has a knife edge 69 which rests on the standard 70. The standard 70 is rigidly secured to the diaphragm 32. The beam 67 is provided with manually movable weights 71 for asserting a predetermined pressure upon the standard 70 and hence upon the diaphragm 32. In addition there is provided a third weight 72, the position of which may be adjusted by the turning of the worm 73 by means of the motor 24. The motor 24 operates through a worm and gear train and Geneva stop mechanism similar to that shown in Figure 2 and which is housed in box 74. Movements of the Geneva stop wheel are transmitted to the worm 73 through the universal coupling 75.

The apparatus shown in Figure 4 operates in a manner similar to that of Figure 2. Major corrections are applied by movements of the motor 24 which operates to change the position of the weight 72 by movements of the worm 73. A movement of the weight 72, however, only occurs when the Geneva stop wheel is given a fraction of a turn as previously described in detail. By changing the position of the weight 72 the downward pressure exerted on the diaphragm 32 is similarly varied and the setting of the valve 30 is changed. Minor corrections are applied as before by means of the motor 25. If this motor tends to turn in a clockwise direction, the valve 64 will be opened and some of the fluid from the supply source will be admitted to the lower diaphragm chamber. This will have the effect of raising the diaphragm which in turn will partially close the valve 30. By a movement of the motor in a counter-clockwise direction, the valve 63 is opened, which exhausts a part of the fluid in the lower diaphragm chamber and permits a corresponding opening of the valve 30. As in the mechanism shown in Figure 2, the pipe 60 serves to compensate for any changes which may occur in the fluid supply pressure. In this figure, however, the pipe 60 is connected to the lower diaphragm chamber through the passage 61 and consequently an increase in the pressure will immediately effect a raising of the diaphragm 32 and a partial closing of the valve 30. The opposite effect is produced by a decrease in the pressure of the fluid supply source.

Figure 5:
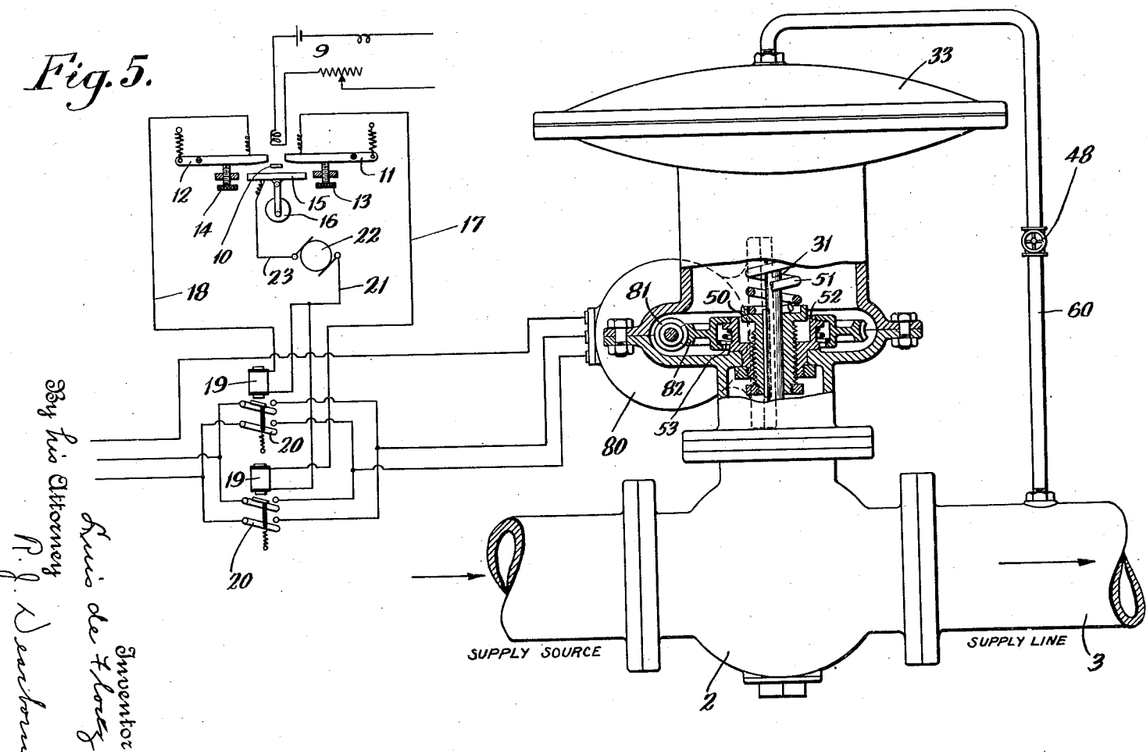
Figure 5 is a partially sectional elevation of another modified form of the valve control mechanism.

In the form of mechanism shown in Figure 5 a single type of correction is applied in response to the supervisory control system to the pressure head, exclusive of the pressure compensation achieved through means of the pipe 60 leading from the supply line 3 to the upper diaphragm chamber. This pressure compensating device operates to vary the valve setting as previously described. On the shaft of the motor 80 is a worm 81 which cooperates with a worm wheel 82 mounted on a flange on the member 52. The worm wheel 82 is firmly but yieldingly held against member 52 by the spring 53. Corrections are applied by the motor 80 in response to impulses from the periodical contacting mechanism and the motor 80 being energized for a period of time corresponding to the period of contact rotates the member 52 through means of the worm 81, worm wheel 82 and the connecting spring 53. This movement raises or lowers the sleeve 50, since this member, as previously pointed out, is externally threaded to cooperate with the member 52. The change in the position of the sleeve 50 changes the compression of the spring 51 and may establish through the valve stem 31 a corrected setting of the valve in the valve casing 2.

This application is a continuation of my application Serial No. 82,865, filed January 21, 1926.

While I have specifically described and illustrated certain means for accomplishing the principles of my invention, it is obvious that various other embodiments might be evolved by those skilled in the art and I, therefore, desire to be limited only as indicated in the appended claims.

What I claim is:

1. In a fluid system, a source of fluid supply, a point of fluid use, a supply line connecting the source of supply with the point of use, means between the source of supply and the supply line for maintaining a substantially uniform head in the supply line, current operated means adapted to cooperate with said first means to effect continuing changes in the supply line head, a second current operated means adapted to cooperate with said first means to effect temporary changes in the supply line head, and means responsive to changes in the value of a condition from a predetermined value for controlling the operation of both said current operated means.

2. In a fluid fuel supply system, a furnace or the like, a burner for heating the furnace, a source of fuel supply, a supply line connecting the source of supply with the burner, a valve between the supply source and the supply line, means to actuate the valve to maintain a substantially uniform head in the supply line, current operated means adapted to cooperate with said first means to effect continuing changes in the supply line head, a second current operated means adapted to cooperate with said first means to effect temporary changes in the supply line head, and means responsive to changes from a predetermined temperature at a selected point in the furnace for controlling the operation of both said current operated means, whereby the temperature of the furnace at the selected point will be maintained substantially constant.

3. The process of regulating the flow of a fluid in a fluid system, which comprises establishing a substantially uniform head in the system, and automatically and arbitrarily varying the head at suitable periodic intervals, from that previously established, responsively to changes from a predetermined value in a condition, whereby the flow of fluid in the system is maintained in predetermined relationship to changes in the value of the condition.

4. In a fluid system, a source of fluid supply, a point of fluid use, a supply line connecting the source of supply with the point of use, means between the source of supply and the supply line for maintaining a substantially uniform head in the supply line, current operated means adapted to cooperate with said first means to change the head in the supply line, and supervisory means responsive to changes from a predetermined value in a condition for controlling the current supplied to said current operated means, whereby the head in the supply line is maintained in predetermined relationship to changes in the value of the condition.

5. In a fluid system, a source of fluid supply, a point of fluid use, a supply line connecting the source of supply with the point of use, means between the source of supply and the supply line for maintaining a substantially uniform head in the supply line, means to determine changes in the value of a condition, means for minor regulation to vary the head in the supply line, means to translate the changes in the value of the condition into proportional periods of time for which said means for minor regulation is actuated, and a major regulating means adapted to integrate the actuations of the minor regulating means and apply a major change to the head when said integration reaches a predetermined sum.

6. In the process of regulating the flow of a fluid in a fluid system, the steps which comprise establishing a substantially uniform head in the system, arbitrarily varying the head at suitable periodic intervals, from that first established, responsively to changes from a predetermined value in a condition, and after each such periodic variation effecting a return to the first established head.

7. The process of regulating the flow of a fluid in a fluid system, which comprises establishing a substantially uniform head in the system, arbitrarily effecting minor variations in the head, from that first established, responsively to changes from a predetermined value in a condition, and when the minor variations add in one direction to a predetermined sum, effecting a major change in the order of the head, whereby the flow of fluid in the system is maintained in predetermined relationship to changes in the value of the condition.

8. The process of regulating the flow of a fluid in a fluid system, which comprises establishing a substantially uniform head in the system, arbitrarily effecting minor variations at suitable periodic intervals in the head, from that first established, responsively to changes from a predetermined value in a condition, effecting a return to the first established head after each such variation, and when the minor variations add in one direction to a predetermined sum, effecting a major change to establish a head of a different order, from which base minor variations may then be made.

9. The process of regulating the flow of a fluid fuel in a fuel supply system leading to a furnace or the like, which comprises periodically varying the port opening of a valve in the fuel supply line, responsively to changes in the temperature at a selected point having a direct relation to the temperature of the furnace, and automatically controlling the port opening of said valve to maintain substantially uniform the level of head determined by said variations, whereby the temperature is maintained substantially constant at the selected point regardless of changes in head of the fuel supply source.

10. In a fluid system, a source of fluid supply, a point of fluid use, a supply line connecting the source of supply with the point of use, means between the source of supply and supply line for maintaining a substantially uniform head in the supply line, means to determine changes in the value of a condition, regulating means for varying the head in the supply line responsive to changes in the value of the condition, and means controlled by said first means for varying the normal base level from which said regulating means is effective.

11. In a fluid system, a source of fluid supply, a point of fluid use, a supply line connecting the source of supply with the point of use, means between the source of supply and supply line for maintaining a substantially uniform head in the supply line, means to determine changes in the value of a condition, regulating means for varying the head in the supply line, which means is proportionately responsive to changes in the value of the condition from a predetermined value, and means controlled by said first means for varying the normal base level from which said regulating means is effective.

12. In a fluid system, a source of fluid supply, a point of fluid use, a supply line connecting the source of supply with the point of use, means between the source of supply and supply line for maintaining a substantially uniform head in the supply line, means to determine the changes in the value of a condition, regulating means for varying the head in the supply line responsive to changes in the value of the condition and having a limited range of effective regulation, and a second regulating means controlled by said first regulating means cooperating with said first regulating means and operative when the effective range of the latter is exceeded, to vary the normal base level from which said first regulating means shall thereafter be effective.

13. The process of regulating the flow of a fluid in a fluid system which comprises establishing a substantially uniform head in the system, arbitrarily effecting predetermined variations in the head, from that first established, responsively to changes from a predetermined value in a condition, and automatically varying also responsively to changes in the value of the condition the normal base level from that previously established from which level said predetermined variations are thereafter effective.

14. The process of regulating the flow of a fluid in a fluid system which comprises establishing a substantially uniform head in the system, arbitrarily effecting predetermined variations in the head, from that first established, which are proportionately responsive to changes from a predetermined value in a condition, and automatically varying also responsively to changes in the value of the condition the normal base level from that previously established from which level said predetermined variations are thereafter effective.

15. The process of regulating the flow of a fluid in a fluid system which comprises establishing a substantially uniform head in the system, arbitrarily effecting predetermined variations over a limited range in the head, from that first established, responsively to changes from a predetermined value in a condition, and when the effective range of said predetermined variations is exceeded, automatically varying also responsively to changes in the value of the condition the normal base level from that previously established from which level said predetermined variations are thereafter effective.

16. The process of regulating the flow of a fluid fuel in a fuel supply system leading to a furnace or the like which comprises establishing a substantially uniform head in the system, effecting predetermined variations over a limited range in the head, from that first established, responsively to changes in the temperature at a selected point having direct relation to the temperature of the furnace, and when the effective range of said predetermined variations is exceeded, automatically varying also responsively to changes in the value of the condition the normal base level from that previously established from which level said predetermined variations are thereafter effective.

In witness whereof I have hereunto set my hand this 11th day of June, 1930.

LUIS DE FLOREZ.